United States Patent
Maromaty (10) Patent No.: US 12,408,191 B2
(45) Date of Patent: Sep. 2, 2025

(54) MULTI-THREADED VEHICLE COMMUNICATION SYSTEM AND METHOD

(71) Applicant: Transportation IP Holdings, LLC, Norwalk, CT (US)

(72) Inventor: Alexander Maromaty, Bellefonte, DE (US)

(73) Assignee: Transportation IP Holdings, LLC, Norwalk, CT (US)

( * ) Notice: Subject to any disclaimer, the term of this patent is extended or adjusted under 35 U.S.C. 154(b) by 398 days.

(21) Appl. No.: 17/960,613

(22) Filed: Oct. 5, 2022

(65) Prior Publication Data

US 2023/0143035 A1    May 11, 2023

Related U.S. Application Data

(60) Provisional application No. 63/276,042, filed on Nov. 5, 2021.

(51) Int. Cl.
| | |
|---|---|
| *H04W 72/56* | (2023.01) |
| *H04L 5/00* | (2006.01) |
| *H04W 72/51* | (2023.01) |
| *H04L 1/1829* | (2023.01) |

(52) U.S. Cl.
CPC ........... *H04W 72/56* (2023.01); *H04L 5/0048* (2013.01); *H04W 72/51* (2023.01); *H04L 1/1854* (2013.01)

(58) Field of Classification Search
CPC ..... H04W 72/00; H04W 72/10; H04W 72/50; H04W 72/56; H04W 72/048; H04W 72/12; H04L 5/003; H04L 5/0048; H04L 1/1854; H04L 1/1887; H04L 47/24; H04L 47/245; H04L 47/821; H04L 51/21
See application file for complete search history.

(56) References Cited

U.S. PATENT DOCUMENTS

| | | | | |
|---|---|---|---|---|
| 7,039,656 B1 * | 5/2006 | Tsai | ....................... | G06F 21/31 |
| 9,014,696 B1 * | 4/2015 | Gerami | ............... | H04W 74/006 |
| | | | | 370/444 |
| 11,785,636 B1 * | 10/2023 | Polaganga | ........ | H04W 72/1263 |
| | | | | 455/450 |
| 2008/0070545 A1 * | 3/2008 | Lim | ....................... | H04W 4/90 |
| | | | | 455/512 |
| 2010/0267391 A1 * | 10/2010 | Schmitt | ............. | H04W 74/0875 |
| | | | | 455/445 |

(Continued)

FOREIGN PATENT DOCUMENTS

CN    112003915    *    8/2020    ............. H04L 29/08

*Primary Examiner* — Warner Wong
(74) *Attorney, Agent, or Firm* — K&L Gates LLP (57) ABSTRACT

A communication system and method receive messages from mobile systems that may identify sets of data files stored onboard the mobile systems and used for communication with an off-board vehicle control system. Priorities of the mobile system may be assigned based on abilities of the mobile systems to communicate with the control system and/or ownership of the mobile systems. A decision is made as to whether any mobile systems having existing communication threads have a lower priority than another mobile system. An existing communication thread may be assigned to the higher priority mobile system by pre-empting the existing communication thread. An update to one or more of the data files may be communicated via the communication thread that is re-assigned.

18 Claims, 4 Drawing Sheets

(56) References Cited

U.S. PATENT DOCUMENTS

| | | | |
|---|---|---|---|
| 2013/0065626 A1* | 3/2013 | Yokoyama | H04W 74/0866 455/509 |
| 2013/0208647 A1* | 8/2013 | Kottkamp | H04W 72/30 370/312 |
| 2023/0252892 A1* | 8/2023 | Mochizuki | H04W 72/56 340/906 |
| 2024/0259764 A1* | 8/2024 | Barton | H04W 4/023 |

* cited by examiner

MULTI-THREADED VEHICLE COMMUNICATION SYSTEM AND METHOD

CROSS-REFERENCE TO RELATED APPLICATIONS

This application claims priority to U.S. Provisional Application No. 63/276,042 (filed 5 Nov. 2021), the entire disclosure of which is incorporated herein by reference.

BACKGROUND

Technical Field

The subject matter described herein relates to systems and methods for communicating and updating data files used by vehicles.

Discussion of Art

Some vehicles rely on information provided by centralized locations or facilities for determining where and/or how to move within various networks of routes. As one example, some trains may use information communicated by back office systems to operate positive train control (PTC) systems onboard the trains. The information can be used by the onboard components of the PTC systems (along with movement authorities or other information communicated from the back office systems) to determine whether the trains can enter into different segments of track, how fast the trains can safely move, etc.

This information can be communicated via data files sent from the back office systems (or other devices that are off-board the vehicles) to computers onboard the vehicles. Due to repeatedly changing conditions within a network of routes, the information communicated via these data files may need to be frequently updated. Otherwise, one or more vehicles may be traveling without updated information and, as a result, can pose significant safety risks.

Some known communication systems and methods may communicate the data files using server processors via communication threads (one thread per vehicle). The number of threads and processors can be limited. But as the number of vehicles requiring the data files increases, the number of threads and processors needed to communicate the data files also may increase. Therefore, a need may exist for a system and method that allows for communication of data files via more than the fixed number of processors and threads that the processors can handle for sending the data files.

BRIEF DESCRIPTION

In one example, a method is provided that may include assigning priorities to mobile systems based on signals received from the mobile systems, activating communication threads with the mobile systems in an order that is based on the priorities that are assigned, communicating data files to the mobile systems via the communication threads while the communication threads are active, and deactivating the communication threads upon completion of communicating the data files to the mobile systems.

In another example, a communication system is provided that may include a mobile device manager having processors that may assign priorities to mobile systems based on signals received from the mobile systems. The mobile device manager may activate communication threads with the mobile systems using the processors in an order that is based on the priorities that are assigned. The processors may communicate data files to the mobile systems via the communication threads while the communication threads are active. The mobile device manager may deactivate the communication threads upon completion of communicating the data files to the mobile systems.

In one example, a method is provided that may include receiving a first message from a first mobile system of plural mobile systems moving within a network of routes in which a vehicle control system communicates with one or more of the mobile systems to control movement of the one or more of the mobile systems. The first message may identify a set of data files stored onboard the first mobile system and used for communication with the vehicle control system. The method also may include determining that the first mobile system does not have a currently active communication thread with a messaging processor of plural messaging processors in a communication system that is off-board the mobile systems, assigning a priority of the first mobile system based on one or more of an ability of the first mobile system to communicate with the vehicle control system or an ownership of the first mobile system, determining whether the one or more mobile systems having one or more existing communication threads between one or more of the messaging processors and the one or more mobile systems has a lower priority than the priority that is assigned to the first mobile system, assigning a first existing communication thread of the one or more existing communication threads to the first mobile system by pre-empting the first communication thread responsive to determining that the priority of the first mobile system is greater than the lower priority of the one or more mobile systems, and communicating an update to one or more of the data files in the set identified by the first message to the first mobile system via the communication thread that is re-assigned to the first mobile system.

In another example, a communication system may be provided that includes a mobile device manager device that may receive a first message from a first mobile system of plural mobile systems moving within a network of routes in which a vehicle control system communicates with one or more of the mobile systems to control movement of the one or more of the mobile systems. The first message may identify a set of data files stored onboard the first mobile system and used for communication with the vehicle control system, the mobile device manager device also configured to determine that the first mobile system does not have a currently active communication thread with a messaging processor of plural messaging processors in a communication system that is off-board the mobile systems. The mobile device manager device may assign a priority of the first mobile system based on one or more of an ability of the first mobile system to communicate with the vehicle control system or an ownership of the first mobile system. The mobile device manager may determine whether the one or more mobile systems having one or more existing communication threads between one or more of the messaging processors and the one or more mobile systems has a lower priority than the priority that is assigned to the first mobile system. The mobile device manager device may assign a first existing communication thread of the one or more existing communication threads to the first mobile system by pre-empting the first communication thread responsive to determining that the priority of the first mobile system is greater than the lower priority of the one or more mobile systems. The mobile device manager device may direct communication of an update to one or more of the data files in the set identified by the first message to the first mobile system via the communication thread that is re-assigned to the first mobile system.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to multi-thread communication systems and methods that can communicate data files with vehicles. The vehicles may use these data files for a variety of purposes, such as to determine where and/or when the vehicles are allowed to move, how fast the vehicles can move, how to control the vehicles (e.g., to increase efficiencies, decrease emissions, etc.), how to move cargo (where and/or when to pick up or drop off cargo), or the like. The communication systems and methods can communicate data files in a priority based, multi-threaded process for transporting files to mobile devices that may be onboard vehicles.

Unless expressly disclaimed or stated otherwise, the inventive subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

Figure 1:
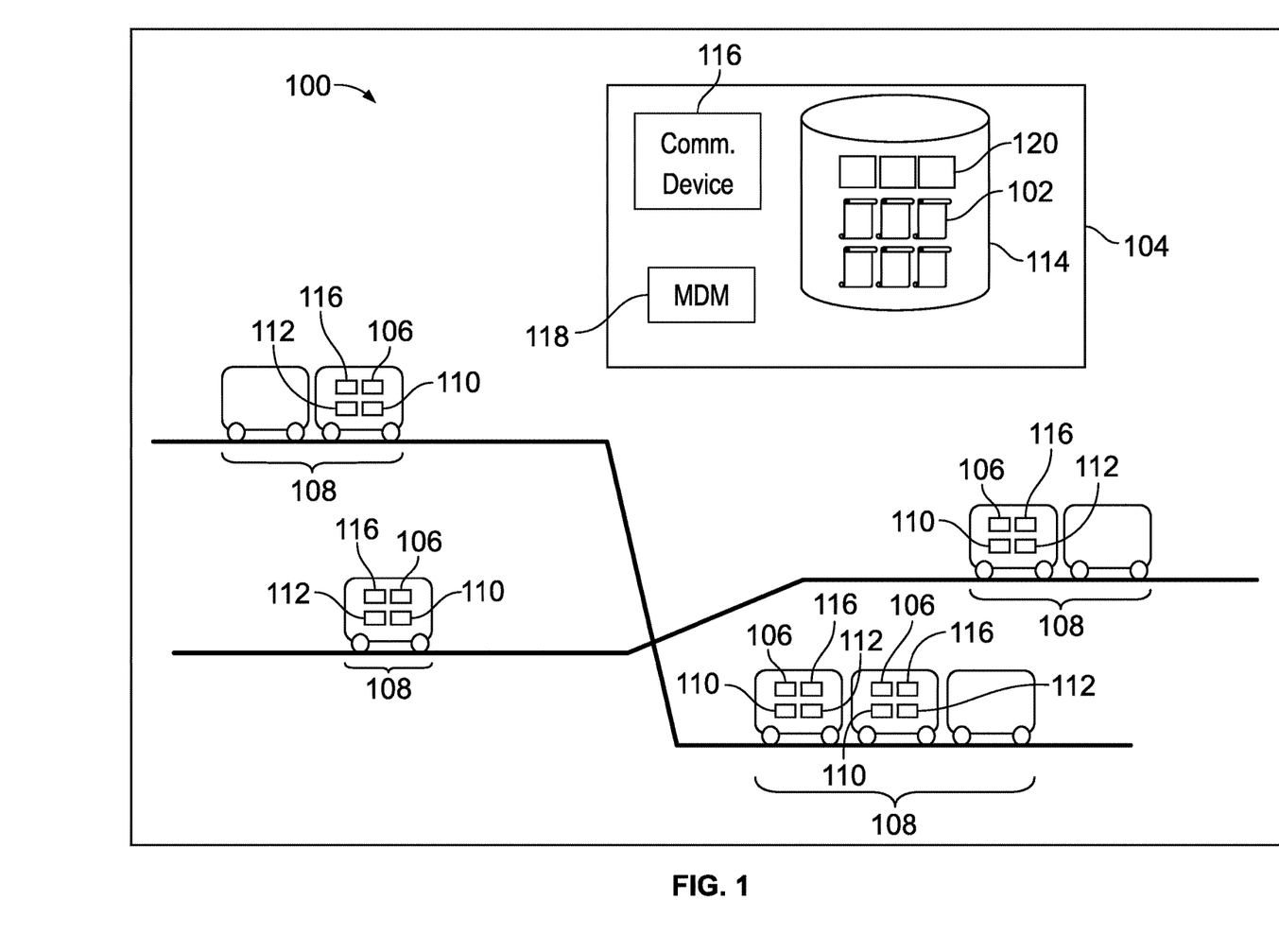
FIG. 1 illustrates one example of a multi-thread communication system.

FIG. 1 illustrates one example of a multi-threaded communication system 100. The communication system can provide for highly efficient transfers of data files 102 between an off-board facility 104 (e.g., a back-office system, dispatch facility, scheduling facility, or the like) and controllers 106 disposed onboard mobile systems 108 (e.g., single or multi-vehicle systems). The controllers can represent onboard computers that control or restrict movement of the mobile systems, such as by automatically controlling propulsion systems 110 and/or brake systems 112 of the mobile systems to change direction, change speed, or the like, based at least in part on the information contained within the data files communicated to the onboard controllers. These controller optionally can be referred to as onboard controllers, mobile controllers, or the like. Optionally, the controller can instruct an operator how to manually control the mobile systems, such as by presenting instructions to the operators to control the propulsion systems and/or brake systems of the mobile systems to change direction, change speed, or the like, based at least in part on the information contained within the data files communicated to the onboard controllers. With respect to rail vehicles, the onboard controller can be referred to as train management computers (TMCs).

The off-board facility can be a centralized or de-centralized location having a tangible and non-transitory computer readable storage medium or media 114 (e.g., a computer memory, such as one or more servers) in or on which the data files are stored (or in or on which data used to form the data files are stored). Optionally, this memory 114 may include one or more messaging processors 120 (e.g., microprocessors, integrated circuits, field programmable gate arrays, etc.) that communicate data to and/or from the memory. The communication of the data contained in a data file from the memory to an onboard controller can take more than an instantaneous period of time and may occupy the processor sending the data in the data file (such that this processor is unable to send the same data and/or other data to another onboard controller at the same time). The communication of this data from the memory to an onboard controller can be referred to as a communication thread.

The off-board facility may include one or more communication devices 116 that can communicate the data files to the onboard controllers. The mobile systems can include additional communication devices that can receive the data files. The communication devices can represent transceiving hardware, such as antennas, receivers, transmitters, modems, or the like. The communication devices can communicate with each other wirelessly and/or via one or more conductive pathways (e.g., wires, cables, or the like).

The off-board facility can include an off-board controller 118 that optionally can be referred to as a mobile device manager (MDM) device. The off-board controller can be responsible for ensuring that the files on the mobile systems are synchronized with the files that are stored in the memory of the off-board facility. For example, the off-board controller can send new data files, can send updates to data files already at the mobile systems, and the like, to make sure that the copies of the files stored onboard the mobile systems match (e.g., are the same as or otherwise contain the same or similar information) the files stored at the off-board facility. This can ensure that the mobile systems have the up-to-date information needed for controlling movement of the mobile systems.

For example, the data files may contain common information, configuration, route topology (e.g., layouts of routes, such as curvatures, locations, grades, etc.), and software (e.g., used to control the mobile systems, updates to software, etc.). This information may include new or changing speed limits for different segments of routes, areas where maintenance is being performed on the routes, areas where other mobile systems are occupying route segments, etc. Using the updated data files locally stored onboard the mobile systems allows the onboard controllers to control the speeds of the mobile systems (to avoid violating speed limits or traveling too fast through an area undergoing maintenance), to change which routes are traveled upon (to avoid areas undergoing maintenance or colliding with another mobile system), etc.

In operation, the onboard or mobile controllers of the mobile systems can be associated with or assigned identifications. These identifications can be unique so that the mobile systems can be differentiated from each other. In one example, the identification of a mobile controller can be a network address of the mobile system, such as an edge message protocol address of the mobile system. The address or identification can be used to route the message(s) (e.g., containing all or parts of the data files) to specific mobile systems. Optionally, one or more of the messages can be broadcast to many mobile systems without addressing the message(s) to any particular mobile system.

The off-board controller can use the address or identification to determine the file or set of files that are required to be synchronized with the onboard controllers of the mobile systems. For example, one or more of the onboard controllers can send messages to the MDM that identify the files locally stored onboard the mobile systems (e.g., in memories similar to the off-board memory of the communication system). These messages can be referred to as client file set messages and may be sent periodically, on demand, or at other times.

The MDM can examine the files identified in the client file set messages received from the onboard controllers and determine whether any files that the mobile systems should have but are not stored onboard any mobile system, whether any files are outdated (e.g., the file onboard a mobile system has been updated or replaced but the mobile system has neither the updated file nor the replacement file), or whether any new files need to be sent to the mobile systems. For example, a necessary file may be missing if the file containing the route information (layout, grades, speed limits, occupancies by other vehicles, etc.) for an area containing routes on which the vehicle is set to move within is not stored onboard the vehicle. Once the MDM makes this determination, the MDM can respond to the client file set messages with responsive messages that identify files for which synchronization may be required. For example, the MDM can determine, for each of the mobile systems that sent a client file set message, whether any files at the mobile system may be missing or out-of-date. The MDM can then send an individualized or customized message for that mobile system that includes a list or other data structure identifying the files requiring synchronization. These files may include files that have changed in some way or that replace another file. The message sent to the mobile system can be referred to as a file set list message. This message can be individualized or customized in that the content of the message may be formed for one mobile system and not for any other mobile system in one embodiment. Optionally, two or more mobile systems may receive the same file set list message (e.g., where the two or more mobile systems have the same files requiring updating). If there are no files that require updating at the mobile system, then the MDM can send the file set list message with no files included in the message (e.g., the message has an empty file set list).

Communication of the client file set message from the onboard controllers to the MDM can inform the MDM of which mobile systems are still active within an area or portion of a network of routes managed by the MDM in one embodiment. For example, different MDMs may be responsible for synchronizing the files onboard mobile systems that are within a geographic area associated with the MDM. Different areas may be associated with different MDMs and mobile systems may be able to move between the different areas such that different MDMs may be responsible for synchronizing the files on the same mobile system at different times. Receipt of a client file set message at the MDM that identifies an onboard controller may inform the MDM that the mobile system in which the onboard controller may be disposed may be traveling within the area associated with the MDM.

The client file set messages sent by the onboard controllers can notify or otherwise indicate (to the MDM) of which mobile systems are active within the network in which the MDM may be disposed. For example, the MDM can maintain a list, table, or other data structure in the memory of the communication system that includes information on which mobile systems and/or onboard controllers have sent client file set messages (e.g., within a predetermined time period). This list, table, or structure can indicate which mobile systems are within the network of routes managed by or otherwise associated with the MDM. In one embodiment, receipt of this message can indicate to the MDM that the mobile system has an active status in a positive vehicle control (PVC) system used to determine when and/or where the mobile systems can move. The PVC system can be a positive control system that sends messages (e.g., from the communication system via the MDM or another device) to mobile systems to inform the mobile systems of speed limits, occupied sections of routes, etc., to indicate whether the mobile systems can enter into an upcoming route segment. Absent receiving such a message, the onboard controller of the mobile system will not allow the propulsion system or brake system to be controlled to move the mobile system into the upcoming route segment. One example of a PVC system may be a PTC system. Optionally, receipt of the client file set message can indicate to the MDM that the mobile system has an active status in a negative vehicle control (NVC) system used to determine when and/or where the mobile systems can move. In contrast to the PVC system, the NVC system can be a negative control system that sends messages (e.g., from the communication system via the MDM or another device) to mobile systems to inform the mobile systems of speed limits, unoccupied sections of routes, etc., to indicate whether the mobile systems cannot enter into an upcoming route segment. Absent receiving such a message, the onboard controller of the mobile system will allow the propulsion system or brake system to be controlled to move the mobile system into the upcoming route segment. Stated differently, with PVC systems, the vehicles or vehicle systems do not move into a route segment unless a signal may be received indicating entry into the route segment may be safe. With NVC systems, the vehicle or vehicles are allowed to freely move into route segments unless a signal may be received indicating entry into the route segment may be unsafe.

The onboard controllers of some mobile systems may or may not be configured, programmed, or equipped to interact with a PVC or NVC system. For example, these types of onboard controllers may not automatically change movement of a vehicle system based on signals received from a PVC or NVC system. Conversely, the onboard controllers of other mobile systems may be configured, programmed, or equipped to interact with the PVC or NVC system so that these onboard controllers may automatically change movement of a vehicle system based on signals received from a PVC or NVC system, as described above. Communication of a client file set message from a mobile system to the MDM can indicate the status of the mobile system in the PVC or NVC system. If no such message may be received, then this absence of a message receipt can indicate that the mobile system may be not traveling within the network of routes associated with the MDM or that the mobile system does not have an onboard controller equipped to operate with the PVC or NVC system.

The client file set message can therefore identify both the mobile system (e.g., the ID of the mobile system) and the network status of the mobile system (e.g., the mobile system may be or may not be moving in the network of routes associated with the MDM). The MDM can use this information (e.g., the status and identification of each mobile system) to assign a priority to the mobile system.

The priorities may be assigned to the mobile systems based on both the status of the mobile system and ownership of the mobile system. With respect to ownership, different entities may own title to mobile systems and/or the routes on which the mobile systems move within one or more networks. For example, some railroad companies may own the tracks and some mobile systems (or have leased or rented the mobile systems). If the MDM determines that a mobile system may be in the network of the MDM (e.g., the PVC or NVC status may be active), then the MDM may assign a first or highest priority to that mobile system. If the MDM determines that the mobile system may be owned by the same entity owning or managing the network of routes (e.g., controlling the PVC or NVC system) but the mobile system does not have an active PVC or NVC status, then the MDM may assign a lower, second priority to the mobile system. For example, the mobile system may be moving within the network of routes associated with the MDM and be owned by the same entity that may be controlling the communication system, but the mobile system may not have an onboard controller that operates based on signals received from the PVC or NVC system. But if the MDM determines that the mobile system may not be owned by the same entity owning or managing the network of routes and the mobile system does not have an active PVC or NVC status, then the MDM may assign a lower, third priority. The first priority can be referred to as a local-in-control priority, the second priority can be referred to as a local priority, and the third priority can be referred to as the tenant or foreign priority. Optionally, one or more other priorities may be assigned.

The MDM can assign threads of communication between the memory of the communication system and the onboard controllers of the different mobile systems to update the data files locally stored at the mobile systems based on the assigned priorities. As described above, a communication thread can be active while a processor (e.g., a microprocessor, integrated circuit, etc.) may be sending (and/or receiving) data to (and/or from) the onboard controller. The communication thread can be inactive once the sending of a data file may be complete. Because the number of processors in the communication system may be limited, the number of communication threads that can exist (and be sending data files) at the same time also may be limited. The MDM can control which mobile systems have a communication thread for the communication of new, updated, or otherwise changed data files (used in connection with the PVC or NVC system) and which mobile systems do not have such a communication thread at the same time based on the priority assignments. This can impact or control how quickly the different mobile systems receive new, updated, or otherwise changed data files. As one example, the first priority mobile systems may download a new set of data files within a maximum time of fifteen minutes while the second priority mobile systems may download a new set of data files within a maximum time of sixty minutes and the third priority mobile systems download a new set of data files within a maximum time of twenty four hours. This can allow for PVC- or NVC-enabled mobile systems to download the required files (for working with the PVC or NVC system) as quickly as possible because the safe operation of these mobile systems may depend on the onboard controllers having the latest set of files. Then, the mobile systems owned by the entity that controls the PVC or NVC system download the files, followed by other mobile systems.

Figure 2:
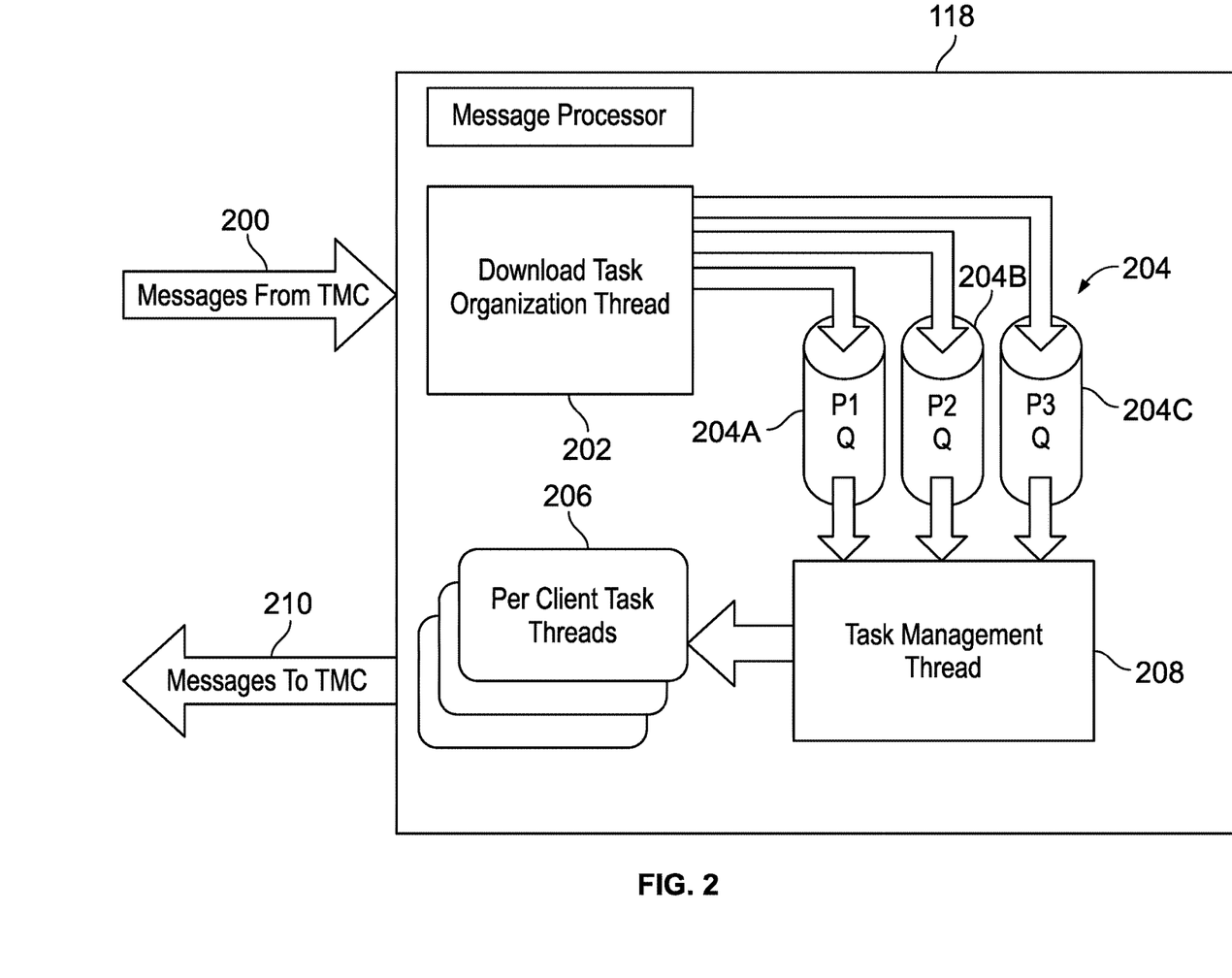
FIG. 2 schematically illustrates one example of a mobile device manager (MDM) device shown in FIG. 1.

FIG. 2 schematically illustrates one example of the MDM shown in FIG. 1. The MDM can receive messages 200 from the onboard controllers or TMCs of the mobile systems. As described above, these messages can indicate which data files (used for determining when and/or where the mobile systems can travel according to a PVC system and/or NVC system) are stored onboard the mobile systems. These messages are processed by the MDM (e.g., illustrated as a download task organization thread 202) and are placed into separate queues 204 (e.g., queues 204A, 204B, 204C) based on the priority assigned to the mobile system that sent the message 200. The queue 204A can represent the queue, order, or sequence in which the data files are to be sent to the first or highest priority mobile systems, the queue 204B can represent the queue, order, or sequence in which the data files are to be sent to the second or middle priority mobile systems, and the queue 204C can represent the queue, order, or sequence in which the data files are to be sent to the third or lowest priority mobile systems.

The MDM can create communication threads 206 through a task management operation or thread 208, and assign each of different processors of the memory to communicate with a different mobile system using a different communication thread. The communication thread may begin once a processor may be assigned to a mobile system and/or begins sending data packets forming at least part (or all) of the files in the set of files to be sent to the mobile system. The communication thread may terminate once this processor has completed communication of the files in the set of files to be sent to the mobile system. The MDM can assign different threads to different mobile systems with different processors of the memory assigned to the different mobile systems to communicate using the assigned threads. In one example, a communication thread indicates that a processor may be assigned to a mobile system and may be communicating (via the communication devices) data files with the mobile system. The data files to be sent to the different mobile systems via the different communication threads can be sent via task thread messages 210.

The MDM can dynamically change or adjust the threads (e.g., the assignment of which processor may be communicating files with which mobile system) based on the assigned priorities and changes in the mobile systems that need to communicate (e.g., update) the sets of files locally stored in the mobile systems. The mobile systems needing to communicate with the MDM can change over time due to some mobile systems entering into the network of routes associated with the MDM and/or other mobile systems leaving the network of routes associated with the MDM.

As one example, the messaging processors of the communication system may each be communicating data files within different communication threads with different mobile systems. The MDM may receive a client file set message from a first mobile system that does not currently have a communication thread with any of the messaging processors of the communication system. The client file set message from this first mobile system may indicate that the first mobile system may be to be assigned a higher priority in the communication thread queue than other mobile systems having one or more existing lower threshold communication threads (e.g., communication threads with mobile systems assigned lower priorities).

The MDM can identify which of these existing communication threads has a recent or the most recently processed message and pre-empt or terminate the communication thread with a recent or most recently processed message. The recent or most recently processed message can be the file (formed of several data packets) that may be successfully and completely communicated most recently out of the several communication threads. For example, the MDM can review the status of communicating files in the lower priority communication threads, determine which of these existing lower priority communication threads may be the first to complete communication of a file, and terminate this communication thread. This can avoid interrupting a communication thread that may be in the middle of sending packets forming a file being sent to the mobile system(s). The MDM can then direct the same messaging processor that was controlling the terminated or pre-empted communication thread to begin a new communication thread with the higher priority mobile system.

If a lower or lowest priority mobile system requires files to be sent for updating, the MDM can wait for a messaging processor to be available and for no other higher priority mobile systems to request files before assigning a messaging processor to initiate a communication thread with the lower or lowest priority mobile system. For example, if a third priority mobile system requires a file set update, the MDM can wait for a messaging processor to complete sending a set of files to another mobile system (of the same or higher priority) and then begin a new communication thread with the third priority mobile system (so long as no higher priority mobile systems request an updated file set prior to beginning the new communication thread).

The MDM can store a list of communication threads that were pre-empted or otherwise terminated before completion of sending a new or updated set of files to a mobile system. Once a communication thread that pre-empted another communication thread ends, the MDM can direct the same or another messaging processor to complete the pre-empted communication thread.

The MDM can control or limit the number of currently active communication threads that can be used at the same time to communicate data files with mobile systems. For example, MDM can restrict how many of the messaging processors can be communicating data files with the mobile systems to no more than a threshold number of communication threads. The number of communication threads or messaging processors can be limited by the MDM to fewer than the total number of available messaging processors in one embodiment. This can restrict how many mobile systems are downloading data files from the memory at the communication system at the same time.

When a communication thread may be created or otherwise initiated for a mobile system, the priority assigned to the mobile system by the MDM can be stored (e.g., in the memory) as part of the thread object. When a message may be received from the mobile system via this communication thread, the time at which the message was received by the MDM can be saved or stored in the memory (e.g., stored in or as part of the thread object).

For example, when a message may be received by the MDM from a mobile system, the MDM determines whether an existing communication thread may be already active for this mobile system. If no communication thread may be already active for the mobile system, the MDM determines whether there may be an available communication thread for the mobile system. In one example, the MDM can count and compare the number of active communication threads (that are currently communicating data with mobile systems) with the threshold number of communication threads. If the number of currently active communication threads may be less than the threshold number, a new thread can be created by the MDM for this mobile system (e.g., by assigning a messaging processor to handle the messages from this mobile system).

If no threads are available (e.g., the number of currently active communication threads may be not less than the threshold number) and the priority of the mobile system that sent the message may be lower than the priority of any of the currently active communication threads, the MDM may pre-empt a communication thread of lowest priority that has most recently processed (e.g., by placing the communication thread into a wait state or holding state). A new communication thread can be created by the MDM for this mobile system along with a message processor to handle the messages from this mobile system.

But if no additional communication threads are available, the MDM may not send a response to the message from the mobile system (or may send a response that no thread may be available). The MDM may later determine that a thread may be available for the mobile system and assign the newly available thread to the mobile system for the communication of data files.

The MDM may check for and discard communication threads that are not active. A communication thread may not be active where the communication of all files in the set intended for a mobile system has been completed. One or more messaging processors may remain assigned to a mobile system having all files updated or sent, such that the communication thread remains assigned to a mobile system that no longer needs any additional updated or new files. The MDM can create a cleanup task thread that discards or eliminates these types of communication threads. For example, the MDM may repeatedly check on the status of communicating data files needed to be updated at or sent to the mobile systems via the different communication threads. The MDM may determine that a thread may be complete when no message may be sent via the thread within a designated period of time. For example, if no message may be received from the mobile system and/or no message may be sent to the mobile system within sixty seconds since the last sent message in the communication thread, the MDM may determine that the communication thread may be inactive.

Figure 3A:
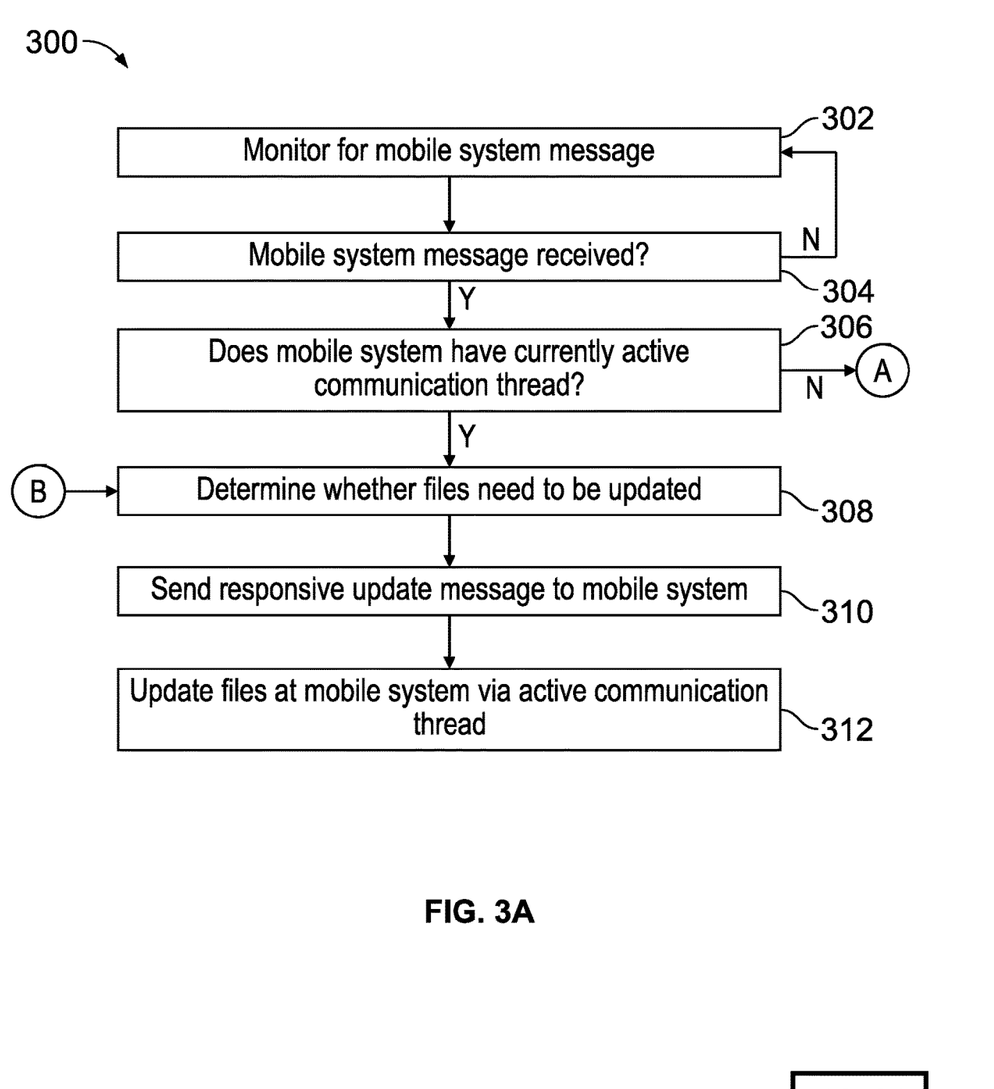
FIGS. 3A and 3B illustrate a flowchart of one example of a method for communicating with mobile systems.
Figure 3B:
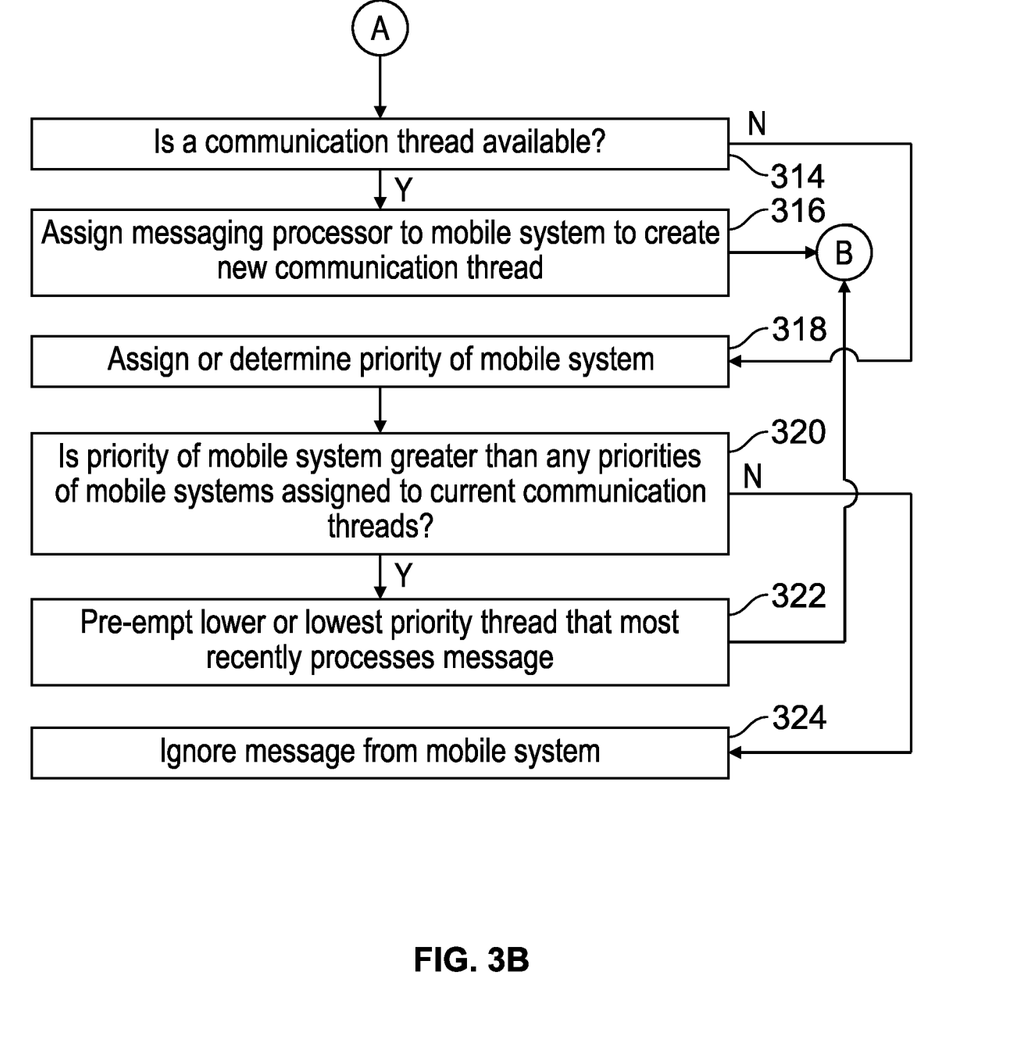

FIGS. 3A and 3B illustrate a flowchart of one example of a method 300 for communicating with mobile systems, such as vehicles or vehicle systems. The method can represent at least some of the operations performed by the communication system described herein. At step 302 (shown in FIG. 3A), one or more communication devices monitor for receipt of a message from a mobile system. For example, the communication device 116 may look for client file set messages from one or more mobile systems moving within a network of routes in which the communication system updates files for the mobile systems to communicate with a PVC or NVC system. At step 304 (shown in FIG. 3A), a decision may be made as to whether a message is received from a mobile system. If a message is received from a mobile system, this can indicate that the mobile system may be traveling in or near the network of routes associated with the communication system (and/or PVC or NVC system) and that the files stored onboard the mobile system may need to be checked for updates. As a result, flow of the method can flow toward step 306 (shown in FIG. 3A). Otherwise, the communication system can continue monitoring for messages from mobile systems and flow of the method can return toward step 302 or terminate.

At step 306, a decision may be made as to whether the mobile system that sent the message (received at step 304)

has a currently active communication thread. The MDM can determine whether the mobile system has a messaging processor currently assigned to be communicating files, updates to files, etc., with the mobile system. If there is a currently active thread, then communication with the mobile system can continue using the active thread. As a result, flow of the method can proceed toward step 308 (shown in FIG. 3A). If there is no currently active thread for the mobile system that sent the message (received at step 304), then a new communication thread may be needed to send the files to the mobile system. As a result, flow of the method can proceed toward step 314 (shown in FIG. 3B).

At step 308, the files that need to be updated at the mobile system are identified. The MDM can compare the list of files sent from the mobile system (e.g., via the message received at step 304) with a list of files stored in the memory 114 to determine whether any files at the mobile system are old or outdated compared to the files at the memory, whether any files in the memory are missing from the list received from the mobile system, or the like.

At step 310 (shown in FIG. 3A), a responsive message may be sent to the mobile system. The MDM can send a message to the mobile system via the communication devices that informs the mobile system whether any files need to be updated and optionally, if any files need to be updated, which files need to be updated or replaced. If no files need to be updated or replaced, then the message sent to the mobile system can be empty or otherwise indicate that no files need to be updated or replaced.

At step 312 (shown in FIG. 3A), one or more files at the mobile system optionally may be updated or replaced. The MDM can direct the messaging processor already assigned to the mobile system (via the currently active communication thread identified at step 306) to send the files or file updates via the active communication thread. If no files need to be updated, however, then the method may skip or omit step 312. The method may then terminate or return to one or more other operations (e.g., step 302).

If the result of the decision at step 306 may be that there is no currently active communication thread with the mobile system, then at step 314 (shown in FIG. 3B), another decision may be made as to whether there are any available communication threads. The MDM can determine whether all messaging processors have been assigned to the mobile systems, or whether one or more messaging processors are not currently assigned to communicating with a mobile system via a communication thread. If there is an available messaging processor, then flow of the method can proceed to step 316, where the available messaging processor may be assigned to the mobile system for creation of a new communication thread. Flow of the method can then return to step 308 (shown in FIG. 3A). For example, the method can proceed by determining which files need updating, if any (e.g., step 308), sending a responsive message to the mobile system (e.g., step 310), and optionally updating the files (e.g., step 312) using the new communication thread created by the newly assigned messaging processor.

But if the MDM decides (e.g., at step 314) that no communication thread is available due to (for example) the messaging processors all being assigned to mobile systems, then flow of the method can proceed toward step 318 (shown in FIG. 3B). At step 318, a priority for the mobile system may be determined or assigned. The MDM can assign or determine the priority of the mobile system based on whether the mobile system has onboard components that communicate with the PVC or NVC system and/or the ownership of the mobile system. Based on either or both of these factors, the MDM can assign a priority to the mobile system, as described above.

At step 320 (shown in FIG. 3B), a decision may be made as to whether the priority of the mobile system is greater than the priority of any other mobile system having a currently active communication thread. If the MDM determines that the mobile system has a higher priority than another mobile system with an existing communication thread, then the MDM may pre-empt the existing communication thread to ensure that the mobile system with the higher priority receives the files or file updates sooner. As a result, flow of the method can proceed toward step 322 (shown in FIG. 3B).

At step 322, the existing communication thread of the lower priority mobile system may be pre-empted and re-assigned to the mobile system having the higher priority. As described above, the MDM may resume the pre-empted communication thread with the lower priority mobile system once the files are updated with the mobile system having the higher priority or as soon as a communication thread becomes available (e.g., due to all higher priority mobile systems completing the file update or download). Flow of the method can return toward step 308 to identify and update the files at the higher priority mobile system, as described above.

But if the priority of the mobile system is no greater than the priorities of the existing communication threads, then the message sent from the mobile system (e.g., received at step 304 in FIG. 3A) can be disregarded or ignored. The MDM may not respond to the message but instead allow the higher priority mobile systems to continue downloading the file updates. The mobile system that sent the ignored message may send the message again at a later time as a check to see if any communication threads are later available. Flow of the method can then terminate or return to one or more prior steps (e.g., step 302 in FIG. 3A).

In one example, a method may be provided that includes receiving a first message from a first mobile system of plural mobile systems moving within a network of routes in which a vehicle control system communicates with one or more of the mobile systems to control movement of the one or more of the mobile systems. The first message may identify a set of data files stored onboard the first mobile system and used for communication with the vehicle control system. The method also may include determining that the first mobile system does not have a currently active communication thread with a messaging processor of plural messaging processors in a communication system that may be off-board the mobile systems, assigning a priority of the first mobile system based on one or more of an ability of the first mobile system to communicate with the vehicle control system or an ownership of the first mobile system, determining whether the one or more mobile systems having one or more existing communication threads between one or more of the messaging processors and the one or more mobile systems has a lower priority than the priority that may be assigned to the first mobile system, assigning a first existing communication thread of the one or more existing communication threads to the first mobile system by pre-empting the first communication thread responsive to determining that the priority of the first mobile system may be greater than the lower priority of the one or more mobile systems, and communicating an update to one or more of the data files in the set identified by the first message to the first mobile system via the communication thread that may be re-assigned to the first mobile system.

In another example, a communication system may be provided that includes a mobile device manager device that may receive a first message from a first mobile system of plural mobile systems moving within a network of routes in which a vehicle control system communicates with one or more of the mobile systems to control movement of the one or more of the mobile systems. The first message may identify a set of data files stored onboard the first mobile system and used for communication with the vehicle control system, the mobile device manager device also configured to determine that the first mobile system does not have a currently active communication thread with a messaging processor of plural messaging processors in a communication system that may be off-board the mobile systems. The mobile device manager device may assign a priority of the first mobile system based on one or more of an ability of the first mobile system to communicate with the vehicle control system or an ownership of the first mobile system. The mobile device manager may determine whether the one or more mobile systems having one or more existing communication threads between one or more of the messaging processors and the one or more mobile systems has a lower priority than the priority that may be assigned to the first mobile system. The mobile device manager device may assign a first existing communication thread of the one or more existing communication threads to the first mobile system by pre-empting the first communication thread responsive to determining that the priority of the first mobile system may be greater than the lower priority of the one or more mobile systems. The mobile device manager device may direct communication of an update to one or more of the data files in the set identified by the first message to the first mobile system via the communication thread that may be re-assigned to the first mobile system.

As used herein, an element or step recited in the singular and proceeded with the word "a" or "an" do not exclude the plural of said elements or operations, unless such exclusion may be explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description may be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such clauses are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   assigning priorities to a plurality of vehicle systems based on signals received from each of the plurality of vehicle systems, wherein the plurality of vehicle systems move within a network of routes in which a vehicle control system communicates with the plurality of vehicle systems to control movement of the plurality of vehicle systems via data files;
   activating communication threads with the plurality of vehicle systems in an order that is based on the priorities that are assigned;
   communicating the data files to the plurality of vehicle systems via the communication threads while the communication threads are active; and
   deactivating the communication threads upon completion of communicating the data files to the plurality of vehicle systems.

2. The method of claim 1, wherein the signals received from the plurality of vehicle systems identify sets of the data files already stored onboard the plurality of vehicle systems.

3. The method of claim 1, wherein the communication threads are activated by assigning different messaging processors of an off-board communication system to different ones of the plurality of vehicle systems, and the data files are communicated by different ones of the messaging processors to the different ones of the plurality of vehicle systems.

4. The method of claim 3, wherein the communication threads are activated for the plurality of vehicle systems currently without an active communication thread of the communication threads.

5. The method of claim 1, wherein the priorities of the plurality of vehicle systems are assigned also based on one or more of abilities of the plurality of vehicle systems to communicate with an off-board communication system or ownerships of the plurality of vehicle systems.

6. The method of claim 1, further comprising:
   pre-empting a first communication thread of the communication threads between a first vehicle system of the plurality of vehicle systems and an off-board communication system and replacing the first communication thread with a replacement communication thread of the communication threads, the replacement communication thread created between the off-board communication system and a second vehicle system of the plurality of vehicle systems.

7. The method of claim 6, wherein the first communication thread is pre-empted by the replacement communication thread responsive to determining that the priority of the second vehicle system is greater than the priority of the first vehicle system.

8. The method of claim 1, wherein communicating the data files includes communicating an update to one or more of the data files via the communication threads.

9. A communication system comprising:
a mobile device manager having processors configured to assign priorities to a plurality of vehicle systems based on signals received from the plurality of vehicle systems, wherein data files include information used to control movement of the plurality of vehicle systems within a network of routes;
the mobile device manager configured:
to activate communication threads with the plurality of vehicle systems using the processors in an order that is based on the priorities that are assigned, wherein the processors configured to communicate the data files to the plurality of vehicle systems via the communication threads while the communication threads are active; and
deactivate the communication threads upon completion of communicating the data files to the plurality of vehicle systems.

10. The communication system of claim 9, wherein the mobile device manager receives the signals that identify sets of the data files already stored onboard the plurality of vehicle systems.

11. The communication system of claim 9, wherein the mobile device manager is configured to activate the communication threads by assigning different ones of the processors to different ones of the plurality of vehicle systems, and the data files are communicated by the different ones of the processors to the different ones of the plurality of vehicle systems.

12. The communication system of claim 11, wherein the mobile device manager is configured to activate the communication threads for the plurality of vehicle systems currently without an active communication thread of the communication threads.

13. The communication system of claim 9, wherein the mobile device manager is configured to assign the priorities of the plurality of vehicle systems also based on one or more of abilities of the plurality of vehicle systems to communicate with the processors or ownerships of the plurality of vehicle systems.

14. The communication system of claim 9, wherein the mobile device manager is configured to:
pre-empt a first communication thread of the communication threads between a first vehicle system of the plurality of vehicle systems and a first processor of the processors; and
replace the first communication thread with a replacement communication thread of the communication threads, the replacement communication thread created between a second processor of the processors and a second vehicle system of the plurality of vehicle systems.

15. The communication system of claim 14, wherein the mobile device manager is configured to pre-empt the first communication thread by the replacement communication thread responsive to determining that the priority of the second vehicle system is greater than the priority of the first vehicle system.

16. The communication system of claim 9, wherein the processors are configured to communicate the data files by communicating an update to one or more of the data files via the communication threads.

17. A method comprising:
receiving a first message from a first mobile system of a plurality of mobile systems moving within a network of routes in which a vehicle control system communicates with one or more of the plurality of mobile systems to control movement of the one or more of the plurality of mobile systems, the first message identifying a set of data files stored onboard the first mobile system and used for communication with the vehicle control system;
determining that the first mobile system does not have a first communication thread with a first messaging processor of a plurality of messaging processors in a communication system that is off-board the plurality of mobile systems;
assigning a priority of the first mobile system;
determining whether the one or more of the plurality of mobile systems having one or more existing communication threads between one or more of the plurality of messaging processors and the one or more of the plurality of mobile systems has a lower priority than the priority that is assigned to the first mobile system;
assigning a first existing communication thread of the one or more existing communication threads to the first mobile system by pre-empting the first communication thread responsive to determining that the priority of the first mobile system is greater than the lower priority of the one or more of the plurality of mobile systems; and
communicating an update to one or more of the set of data files identified by the first message to the first mobile system via the first existing communication thread that is re-assigned to the first mobile system.

18. The method of claim 17, wherein the priority of the first mobile system is assigned based on one or more of an ability of the first mobile system to communicate with the vehicle control system or an ownership of the first mobile system.

* * * * *